United States Patent
Chang et al.

(10) Patent No.: US 6,650,391 B2
(45) Date of Patent: Nov. 18, 2003

(54) PIXEL SIGNAL LINE MODULE OF LIQUID CRYSTAL DISPLAY

(75) Inventors: Pin Chang, Hsinchu (TW); Heng-Chung Wu, Hsinchu Hsien (TW)

(73) Assignee: Giantplus Technology Co., Ltd., Miaoli Hsien (TW)

( * ) Notice: Subject to any disclaimer, the term of this patent is extended or adjusted under 35 U.S.C. 154(b) by 66 days.

(21) Appl. No.: 10/072,930

(22) Filed: Feb. 12, 2002

(65) Prior Publication Data

US 2003/0151574 A1 Aug. 14, 2003

(51) Int. Cl.[7] .............................................. G02H 1/343
(52) U.S. Cl. ........................ 349/144; 349/106; 345/88
(58) Field of Search ................................ 349/106, 144; 345/88, 87, 89

(56) References Cited

U.S. PATENT DOCUMENTS

| | | | | |
|---|---|---|---|---|
| 5,530,570 A | * | 6/1996 | Terumoto | 349/106 |
| 5,606,437 A | * | 2/1997 | Mosier | 349/106 |
| 6,259,504 B1 | * | 7/2001 | Shin et al. | 349/144 |
| 2002/0140655 A1 | * | 10/2002 | Liang et al. | 345/89 |

* cited by examiner

*Primary Examiner*—Tarifur R. Chowdhury
(74) *Attorney, Agent, or Firm*—Rosenberg, Klein & Lee

(57) ABSTRACT

The present invention provides a pixel signal line module of a liquid crystal display, wherein a plurality of sub-pixels are alternately arranged in delta form on a liquid crystal display panel. A plurality of signal scan lines are used to cover and connect each transversally arranged pixel. A plurality of longitudinal data signal lines alternately shift leftwards and rightwards according to the checkered arrangement of the longitudinal sub-pixels so as to connect the sub-pixels in two adjacent longitudinal rows together in indented way. The present invention lets the signal lines be not limited by the arrangement of sub-pixels, and has the advantages of enhanced resolution, larger signal line's width, reduced impedance, and less signal distortion.

18 Claims, 5 Drawing Sheets

PIXEL SIGNAL LINE MODULE OF LIQUID CRYSTAL DISPLAY

FIELD OF THE INVENTION

The present invention relates to a liquid crystal display and, more particularly, to an improved pixel signal line module of liquid crystal display.

BACKGROUND OF THE INVENTION

Along with enhancement of scientific technology and living quality, information products have gone deep into every aspect of life. Displays are inevitable equipments of the present information society. They play the roles as output devices for showing pictures and texts. In a common display, an image output is composed of many pixels of different colors and brightness. Each pixel comprises three sub-pixels of the three primary colors—red (R), green (G), and blue (B). Each sub-pixel is connected to a signal scan line (Common) and a data signal line (Segment). Each signal scan line is provided with scan signals by a signal scan line driving circuit, and each data signal line is provided with video data by a data signal line driving circuit. The brightness and darkness of each sub-pixel can thus be controlled to achieve full-color mode by mixing the three primary colors according to proportion.

In a prior art liquid crystal display panel, when a plurality of sub-pixels 12 respectively having the R, G, and B colors are arranged in delta form, a pixel signal line module 10 thereof is shown in FIG. 1. Data signal lines 14 are longitudinally and parallel arranged, and each of the data signal line 14 needs to pass through a pitch between two adjacent transversal rows of sub-pixels 12 for connecting the longitudinally spaced sub-pixels 12. Signal scan lines 16 are transversally and parallel arranged to respectively connect each transversally arranged sub-pixel 12. A data signal line driving circuit 18 and a signal scan line driving circuit 20 are disposed at the edge of the liquid crystal display panel to control driving signals so as to fast and repetitively scan each sub-pixel 12 for forming a frame.

However, along with the development of general portable liquid crystal displays toward miniaturization, the pitch between adjacent sub-pixels needs to decrease without reducing the resolution of image. Therefore, in the above signal line module, the signal line's width needs to relatively decrease, hence resulting in increase of impedance of the signal line. The liquid crystal display thus has the disadvantages of high voltage, large load, and high power consumption when operating. Moreover, this kind of layout easily results in quick attenuation of signal to cause distortion of signal.

Accordingly, the present invention aims to propose a pixel signal line module of liquid crystal display, which is not limited by the pitch between sub-pixels.

SUMMARY OF THE INVENTION

The primary object of the present invention is to propose a pixel signal line module of liquid crystal display, which is not limited by the arrangement of sub-pixels on a color filter and has larger width of ITO signal line to reduce the impedance and improve the situation of signal distortion.

Another object of the present invention is to propose a pixel signal line module letting a liquid crystal display have a small load and a low power consumption.

Yet another object of the present invention is to propose a method for increasing the resolution of a liquid crystal display.

According to the present invention, a plurality of sub-pixels of colors selected from the red, blue, and green colors are alternately arranged on a liquid crystal display panel in delta form. A pixel signal line module thereof connects each transversally arranged sub-pixel together with a signal scan line. A longitudinal data signal line alternately shifts leftwards and rightwards according to the checkered arrangement of the longitudinal sub-pixels so that the data signal lines connect the sub-pixels in two adjacent longitudinal rows together in indented way.

The various objects and advantages of the present invention will be more readily understood from the following detailed description when read in conjunction with the appended drawings, in which:

DETAILED DESCRIPTION OF THE PREFERRED EMBODIMENTS

Figure 1:
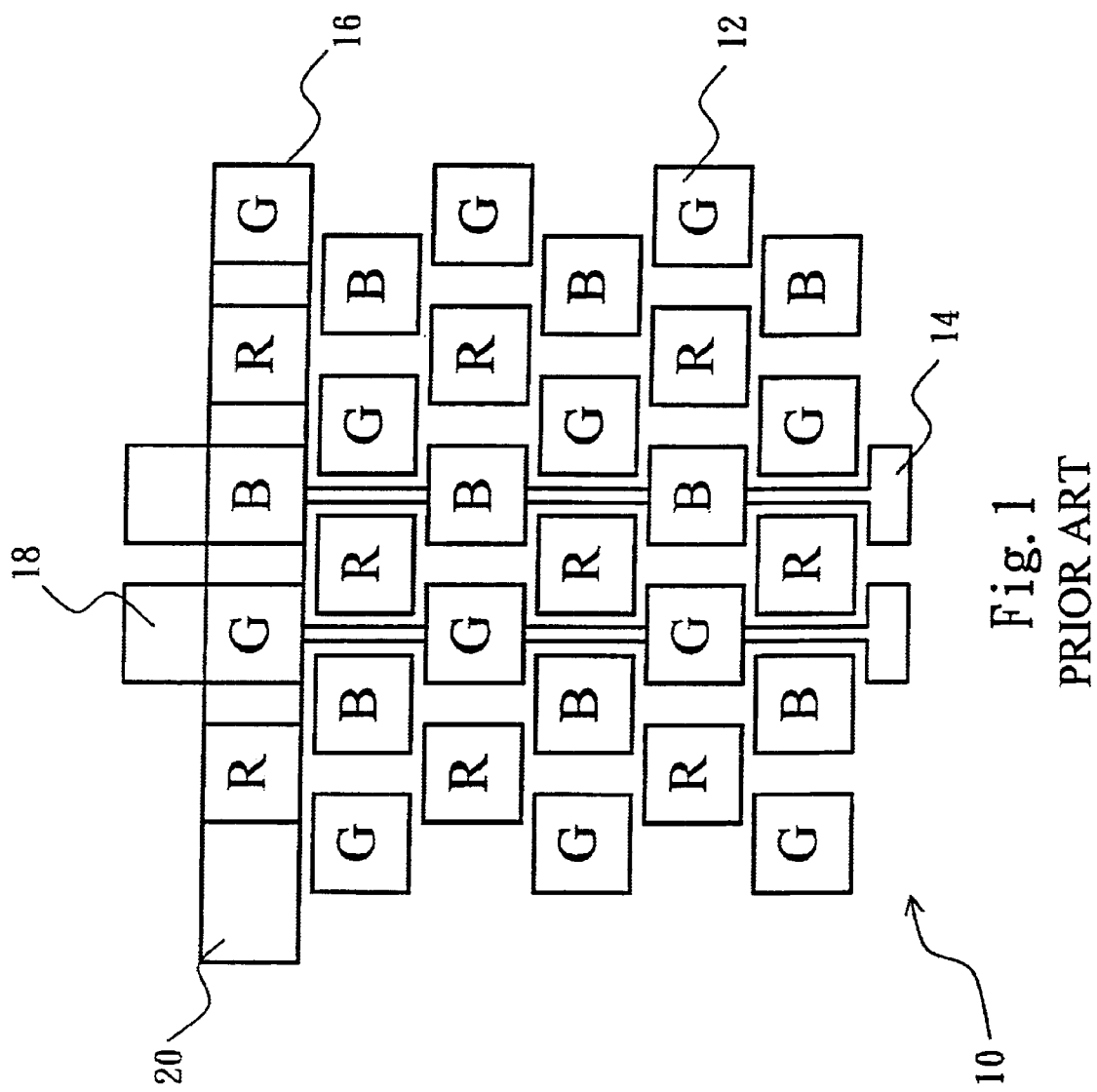
FIG. 1 is a diagram of a prior art pixel signal line module.
Figure 2:
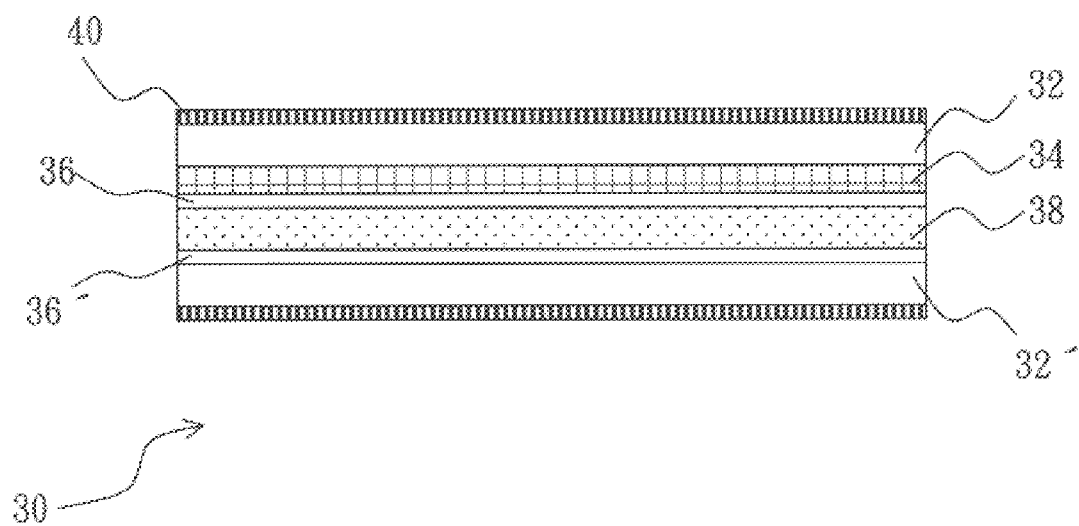
FIG. 2 is a structure diagram of a liquid crystal display panel.
Figure 3:
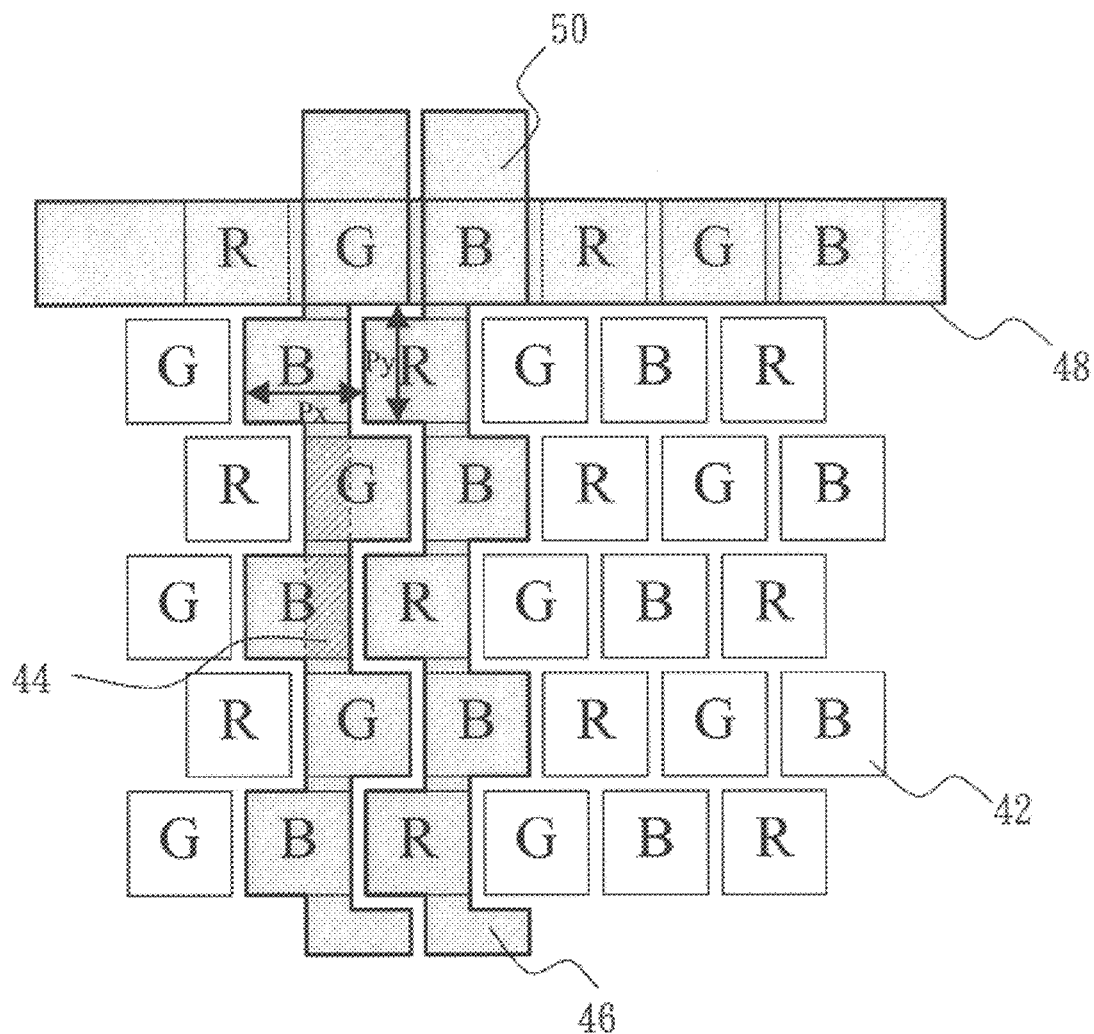
FIG. 3 is a diagram of the pixel signal line module of the present invention.

As shown in FIG. 2, a liquid crystal display panel 30 is formed by clamping in order from top to bottom a color filter 34, a transparent electrode plate 36, a liquid crystal layer 38, and a transparent electrode plate 36' between two transparent substrates 32 and 32'. A polarizing plate 40 covers on the outer surface of each of the two transparent substrates 32 and 32'. The color filter 34 has a plurality of sub-pixels 42 selected from the red (R), green (G), and blue (B) colors thereon. As shown in FIG. 3, the sub-pixels 42 are uniformly and alternately arranged in delta form. That is, each pixel 42 spaced by a transversal row is disposed between two sub-pixels 42 of the adjacent transversal rows. Local blocks 44 thereof correspond to one another. The bright or dark state of each sub-pixel 42 is controlled by a transversal first signal line and a longitudinal second signal line. The first and second signal lines are a signal scan line 48 and a data signal line 46, respectively. Each of the signal scan lines 48 is parallel disposed and covers each transversally arranged sub-pixel 42. Each of the data signal lines 46 alternately shifts leftwards and rightwards according to the checkered arrangement of the longitudinal sub-pixels 42 to form an indented structure, thereby connecting the local blocks 44 of the sub-pixels 42 in every two adjacent longitudinal rows together.

The above data signal lines 46 and the signal scan lines 48 are modules composed of an upper layer and a lower layer of indio tin oxide (ITO), respectively. They are uniformly disposed on the transparent electrode plates 36 and 36' of the liquid crystal display panel 30. Each of the data signal lines 46 and each of the signal scan lines 48 are respectively connected to driving elements 50 disposed at the edge of the liquid crystal display panel 30 to let the data signal lines 46 and the signal scan lines 48 be controlled by the driving elements 50 for controlling the brightness and contrast of the sub-pixels 42. Images of a series of different colors can thus be obtained through combination and variations of the sub-pixels 42 having different colors. If the sum of the horizontal width of the sub-pixels 42 covered by each data signal line 46 and the horizontal spacing between every two sub-pixels 42 is defined as a transversal pitch (Px), and the sum of the vertical width of the sub-pixels 42 covered by each signal scan line 48 and the vertical spacing between every two sub-pixels 42 is defined as a longitudinal pitch (Py), then the ratio of the transversal pitch to the longitudinal pitch can be between 0.4~2.5, and the leftward and rightward shift of each data signal line 46 can be between 10%~90% of the transversal pitch.

In the present invention, because the data signal lines 46 connect the local blocks 44 of the sub-pixels 42 in indented way, the data signal lines 46 will not again limited by the arrangement of the sub-pixels 42 on the liquid crystal display panel 30, and have larger widths. As compared with the layout of data signal lines of a prior art liquid display panel, the present invention has the advantages of enhanced resolution and reduced impedance, hence avoiding distortion of signal. Moreover, decrease of impedance lets the required driving voltage of the liquid crystal display panel be smaller, hence reducing the load and power consumption.

Figure 4:
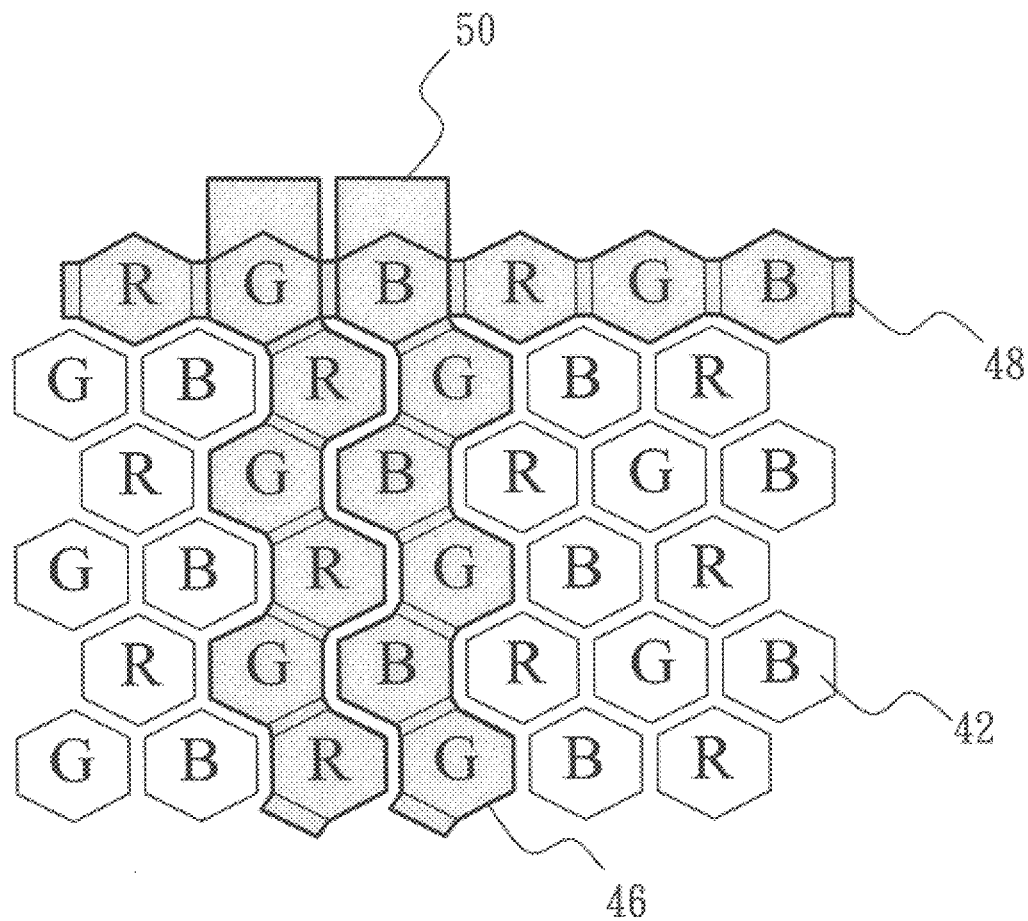
FIG. 4 is a diagram according to another embodiment of the present invention.

FIG. 4 shows another embodiment of the present invention, wherein each sub-pixel 42 is a polygon so that the sub-pixels are arranged in turtleback form. Moreover, the data signal lines 46 alternately shift leftwards and rightwards according to the checkered arrangement of the longitudinal sub-pixels 42 so that the data signal lines 46 longitudinally connect in indented way the sub-pixels 42 in every two adjacent longitudinal rows together, and cover each longitudinally arranged sub-pixel 42. On the other hand, the transversal signal scan lines 48 cover each transversally arranged sub-pixel 42.

Figure 5:
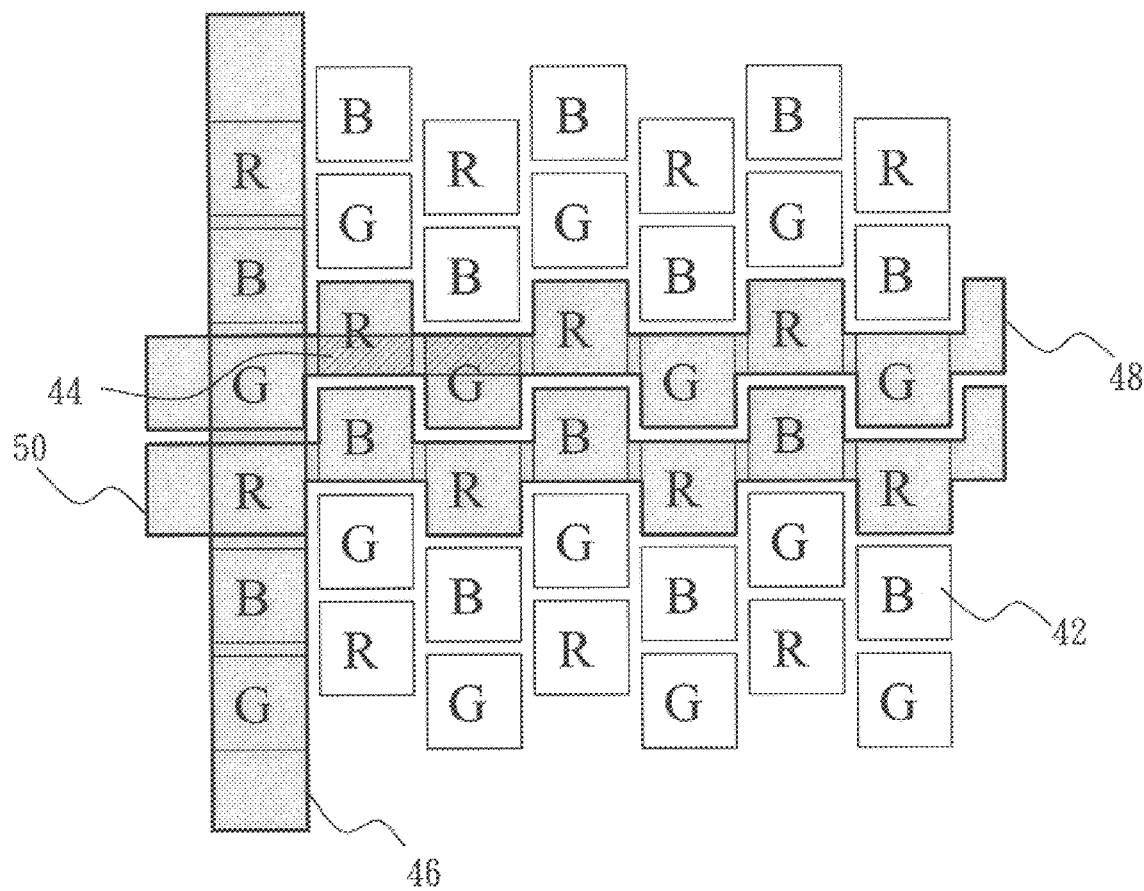
FIG. 5 is a diagram according to yet another embodiment of the present invention.

The pixel signal line module of the present invention can apply to different arrangements of sub-pixels. As shown in FIG. 5, in the sub-pixels 42 arranged in checkered form, the sub-pixel 42 spaced by a longitudinal row are disposed between two sub-pixels of the adjacent longitudinal rows. The longitudinal data signal lines 46 are parallel arranged, and cover each longitudinally arranged sub-pixel 42. Each signal scan line 48 alternately shifts upwards and downwards according to the checkered arrangement of the transversal sub-pixels 42 to form a horizontal and indented structure so as to transversally cover a sub-pixel 42 in every two adjacent transversal rows, and connect the transversally corresponding local blocks 44 of the adjacent sub-pixels 42 together.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A pixel signal line module of liquid crystal display for controlling the brightness and gray-scale contrast of a plurality of sub-pixels to let a liquid crystal display show images, said sub-pixels being arranged in delta form so that two adjacent one of said sub-pixels have local blocks corresponding to each other, each of said sub-pixels being simultaneously driven by a transversal first signal line and a longitudinal second signal line, each of said second signal lines alternately shifting leftwards and rightwards according to the checkered arrangement of said longitudinal sub-pixels so as to connect said local blocks of said adjacent longitudinal sub-pixels together in vertical and indented way.

2. The pixel signal line module of liquid crystal display as claimed in claim 1, wherein said first signal line and said second signal line are a signal scan line and a data signal line, respectively.

3. The pixel signal line module of liquid crystal display as claimed in claim 1, wherein said first signal line and said second signal line are a data signal line and a signal scan line, respectively.

4. The pixel signal line module of liquid crystal display as claimed in claim 1, wherein each of said transversal first signal lines alternately shifts upwards and downwards according to the checkered arrangement of said transversal sub-pixels so as to connect said local blocks of said adjacent transversal sub-pixels together in horizontal and indented way.

5. The pixel signal line module of liquid crystal display as claimed in claim 1, wherein if the sum of the horizontal width of said sub-pixels covered by each of said second signal lines and the horizontal spacing between two adjacent one of said sub-pixels is defined as a transversal pitch, then the leftward and rightward shift of each of said second signal lines is between 10%~90% of said transversal pitch.

6. The pixel signal line module of liquid crystal display as claimed in claim 1, wherein if the sum of the horizontal width of said sub-pixels covered by each of said second signal lines and the horizontal spacing between two adjacent one of said sub-pixels is defined as a transversal pitch, and the sum of the vertical width of said sub-pixels covered by each of said first signal lines and the vertical spacing between two adjacent one of said sub-pixels is defined as a longitudinal pitch, then the ratio of said transversal pitch to said longitudinal pitch is between 0.4~2.5.

7. The pixel signal line module of liquid crystal display as claimed in claim 1, wherein each of said sub-pixels can be a polygon.

8. The pixel signal line module of liquid crystal display as claimed in claim 1, wherein said first signal and said second signal line are modules composed of transparent conductive films of indio tin oxide.

9. The pixel signal line module of liquid crystal display as claimed in claim 1, wherein said sub-pixels are selected from the three colors of red, green, and blue.

10. A pixel signal line module of liquid crystal display for controlling the brightness and gray-scale contrast of a plurality of sub-pixels to let a liquid crystal display show images, said sub-pixels being arranged in delta form so that two adjacent one of said sub-pixels have local blocks corresponding to each other, each of said sub-pixels being simultaneously driven by a transversal first signal line and a longitudinal second signal line, each of said first signal lines alternately shifting upwards and downwards according to the checkered arrangement of said transversal sub-pixels so as to connect said local blocks of said adjacent transversal sub-pixels together in horizontal and indented way.

11. The pixel signal line module of liquid crystal display as claimed in claim 10, wherein said first signal line and said second signal line are a signal scan line and a data signal line, respectively.

12. The pixel signal line module of liquid crystal display as claimed in claim 10, wherein said first signal line and said second signal line are a data signal line and a signal scan line, respectively.

13. The pixel signal line module of liquid crystal display as claimed in claim 10, wherein each of said longitudinal second signal lines alternately shifts leftwards and rightwards according to the checkered arrangement of said longitudinal sub-pixels so as to connect said local blocks of said adjacent longitudinal sub-pixels together in vertical and indented way.

14. The pixel signal line module of liquid crystal display as claimed in claim 10, wherein if the sum of the vertical width of said sub-pixels covered by each of said first signal lines and the vertical spacing between two adjacent one of said sub-pixels is defined as a vertical pitch, then the upward and downward shift of each of said first signal lines is between 10%~90% of said longitudinal pitch.

15. The pixel signal line module of liquid crystal display as claimed in claim 10, wherein if the sum of the horizontal width of said sub-pixels covered by each of said first signal lines and the horizontal spacing between two adjacent one of said sub-pixels is defined as a transversal pitch, and the sum of the vertical width of said sub-pixels covered by each of said first signal lines and the vertical spacing between two adjacent one of said sub-pixels is defined as a longitudinal pitch, then the ratio of said transversal pitch to said longitudinal pitch is between 0.4~2.5.

16. The pixel signal line module of liquid crystal display as claimed in claim 10, wherein each of said sub-pixels can be a polygon.

17. The pixel signal line module of liquid crystal display as claimed in claim 10, wherein said first signal and said second signal line are modules composed of transparent conductive films of indio tin oxide.

18. The pixel signal line module of liquid crystal display as claimed in claim 10, wherein said sub-pixels are selected from the three colors of red, green, and blue.

* * * * *